US007873278B2

(12) United States Patent
Baiden

(10) Patent No.: US 7,873,278 B2
(45) Date of Patent: Jan. 18, 2011

(54) UNDERWATER OPTICAL COMMUNICATIONS SYSTEM AND METHOD

(75) Inventor: Greg Baiden, Lively (CA)

(73) Assignee: Penguin Automated Systems Inc., Naughton, Ontario (CA)

(*) Notice: Subject to any disclaimer, the term of this patent is extended or adjusted under 35 U.S.C. 154(b) by 743 days.

(21) Appl. No.: 10/596,973

(22) PCT Filed: Jan. 11, 2005

(86) PCT No.: PCT/CA2005/000027

§ 371 (c)(1),
(2), (4) Date: Nov. 5, 2007

(87) PCT Pub. No.: WO2005/069247

PCT Pub. Date: Jul. 28, 2005

(65) Prior Publication Data

US 2008/0205892 A1    Aug. 28, 2008

(30) Foreign Application Priority Data

Jan. 16, 2004   (CA)   .................................... 2455284

(51) Int. Cl.
*H04B 10/00* (2006.01)
(52) U.S. Cl. ........................ 398/104; 398/105; 398/118; 367/134; 367/131; 367/133
(58) Field of Classification Search ................ 398/104, 398/105, 33, 177, 140, 135, 124, 118, 119, 398/123, 128, 130; 367/134, 131, 133, 117, 367/910
See application file for complete search history.

(56) References Cited

U.S. PATENT DOCUMENTS 5,894,450 A * 4/1999 Schmidt et al. ............. 367/134
6,813,218 B1 * 11/2004 Antonelli et al. ............. 367/3

(Continued)

FOREIGN PATENT DOCUMENTS

GB      2125965         3/1984

(Continued)

OTHER PUBLICATIONS

Underwater Cableless Data Transmission, J.P. Von der Weid and J.A.P.da Silva, Oceans, 1993, 'Engineering in Hamony with Oceans', proceedings.*

(Continued)

*Primary Examiner*—Hanh Phan
(74) *Attorney, Agent, or Firm*—Dimock Stratton, LLP; Mark Eisen

(57) ABSTRACT

An underwater optical communications system and method particularly suitable for use in communications with automated equipment. A series of light beacons are dispersed throughout a communications zone. The light beacons are each provided with a plurality of light-emitting elements and light receiving elements which are positioned so that each beacon within the communications zone emits light in a plurality of directions and receives light from a plurality of directions. A submersible craft is similarly provided with light emitting elements and light receiving elements. The submersible craft is thus always in optical communication with one or more beacons when in the communications zone, regardless of the orientation of the craft and regardless of the position of the craft within the communications zone.

20 Claims, 17 Drawing Sheets

U.S. PATENT DOCUMENTS

2005/0232638 A1 10/2005 Fucile et al.
2007/0183782 A1 8/2007 Farr et al.

FOREIGN PATENT DOCUMENTS

WO   WO 2008/027072 A2   3/2008

OTHER PUBLICATIONS

U.S. Appl. No. 60/559,330, filed Oct. 20, 2005, Paul Fucile.
High-Bandwidth, Low-Power, Short-Range Optical Communication Underwater, James W. Bales and Chryssostomos Chryssostomidis, MIT Sea Grant College Program, 292 Main Street, Cambridge, MA, 02142, 1999.

* cited by examiner

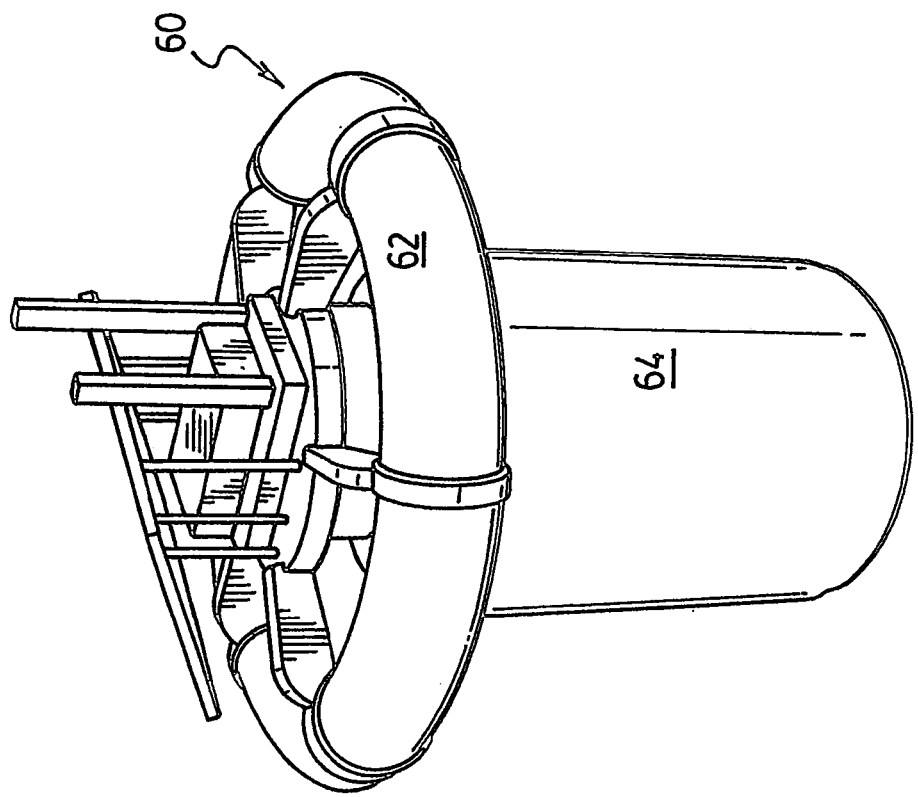
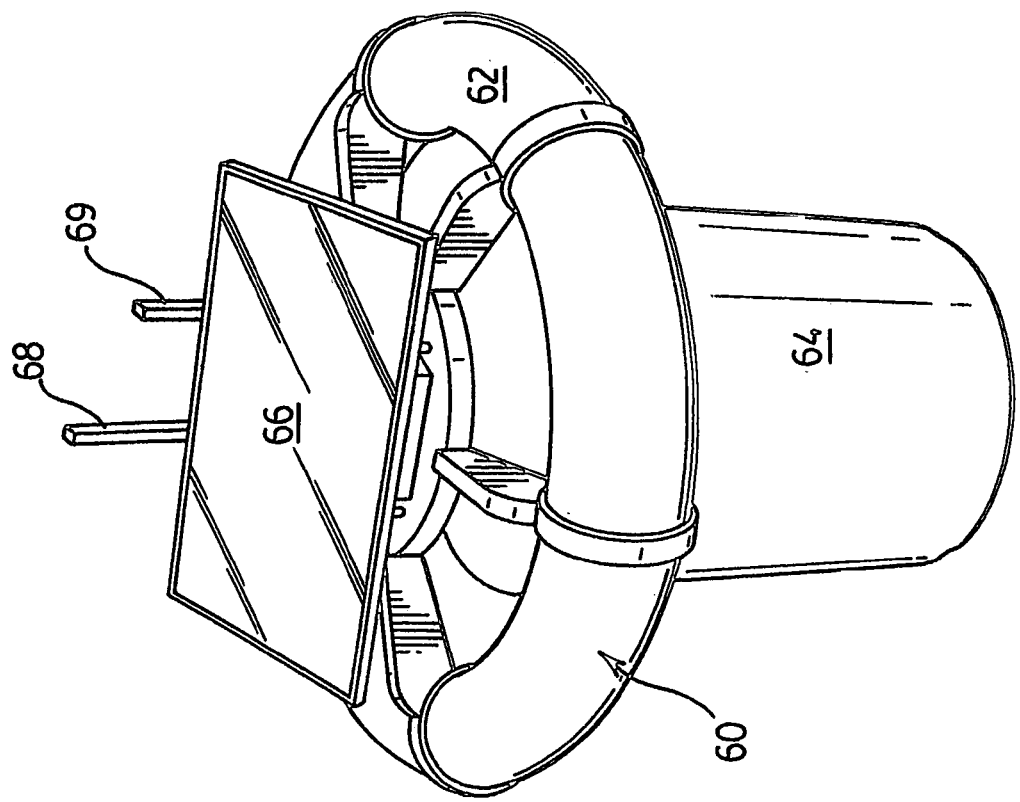

UNDERWATER OPTICAL COMMUNICATIONS SYSTEM AND METHOD

FIELD OF THE INVENTION

This invention relates to communications systems. In particular, this invention relates to an optical communications system particularly suitable for an underwater environment.

BACKGROUND OF THE INVENTION

Many industrial activities are carried on underwater, such as mining, oil exploration and extraction, installation of telecommunications cables etc. Mining in particular is a highly labour intensive activity, especially in an underwater environment because of the increased resistance to movement in water, potential health problems associated with persistent or prolonged deep-sea diving, and the cumbersome equipment required to enable workers to remain submerged for long periods of time.

Such industrial activities invariably benefit from automation, in both reduced labour costs and increased productivity. In land-based mining it is known to provide robotic mining equipment controlled by radio frequency (rf) communications. This enables a relatively small number of workers to remotely control heavy machinery and equipment located in or on a surface mine (for example in open pit mining). The benefits of automation in underwater activities could potentially be significantly greater, because of the reduced mobility of workers operating when submersed.

However, conventional communications methods are often unsuitable for supporting high bandwidth communications in an underwater environment, especially for the control of robotic equipment which requires the exchange of relatively high data rates with a low error rate for the wireless transmission of multiple video signals. Electromagnetic radiation at radio frequencies travels poorly through water due to rapid absorption and attenuation, which severely limits the ability to provide ongoing communications between a land- or surface-based control centre and submersed robotic equipment used in activities such as underwater mining.

Moreover, submersed robotic equipment can be very complex and difficult to operate, requiring a number of fine movements to guide and operate the equipment with the precision necessary for mining and other underwater applications. The observational skills and dexterity required to effectively operate such equipment is substantial and using conventional control systems requires significant training and experience, particularly when the operator is remote from the equipment.

It would accordingly be advantageous to provide a communications system for guiding and operating underwater equipment and machinery which is reliable, fast, and capable of high data rates for use in underwater activities such as mining.

SUMMARY OF THE INVENTION

The present invention provides an underwater optical communications system and method, which is particularly suitable for use in communications with automated mining equipment and machinery.

According to the invention, a series of omni-directional light beacons are dispersed throughout a communications zone. The light beacons are each provided with a plurality of light-emitting elements which are positioned so that each beacon within the communications zone emits light in all directions, to transmit control signals to equipment such as a submersible craft comprising one or more robotic mining mechanisms. Interspersed amongst the light emitting elements are optical receiving elements, for receiving communications from the submersible craft.

The invention further provides a submersible craft which, like the beacons, is covered with light emitting elements and provided with light receiving elements interspersed amongst the light emitting elements.

The beacons are dispersed about the communications zone such that the submersible craft is able to receive optical signals from one or more beacons, and to send optical communications to one or more beacons, regardless of the orientation of the craft or the position of the craft within the communications zone. The beacons may be directional (for example flat or parabolic) or multi-directional (for example spherical or geodesic). The light emitting elements may be discrete, point-type light sources such as LEDs, or may be multi-dimensional such as rope lights or planar optical waveguides. The optical receiving elements may similarly be discrete or multi-dimensional.

Preferably the light receiving elements have a sensitivity threshold which can be set according to the ambient light conditions within the communications zone. The beacons can be placed in proximity as required by the attenuation characteristics of the environment, and can operate in a "hand-off" or cellular fashion, so that as the submersible craft moves from one part of the communications zone to another the most proximate beacons take over the communications function. In the preferred embodiment bit error rate testing and other techniques are used to ensure the integrity of communications and seamless switching between beacons.

These and other advantages will become apparent from the description of the preferred embodiment which follows.

BRIEF DESCRIPTION OF THE DRAWINGS

In drawings which illustrate by way of example only a preferred embodiment of the invention.

FIG. 9 is a schematic perspective view of a floating relay unit for extending the communications capability to above-water communications including GPS and GSM.

DETAILED DESCRIPTION OF THE INVENTION

Figure 1:
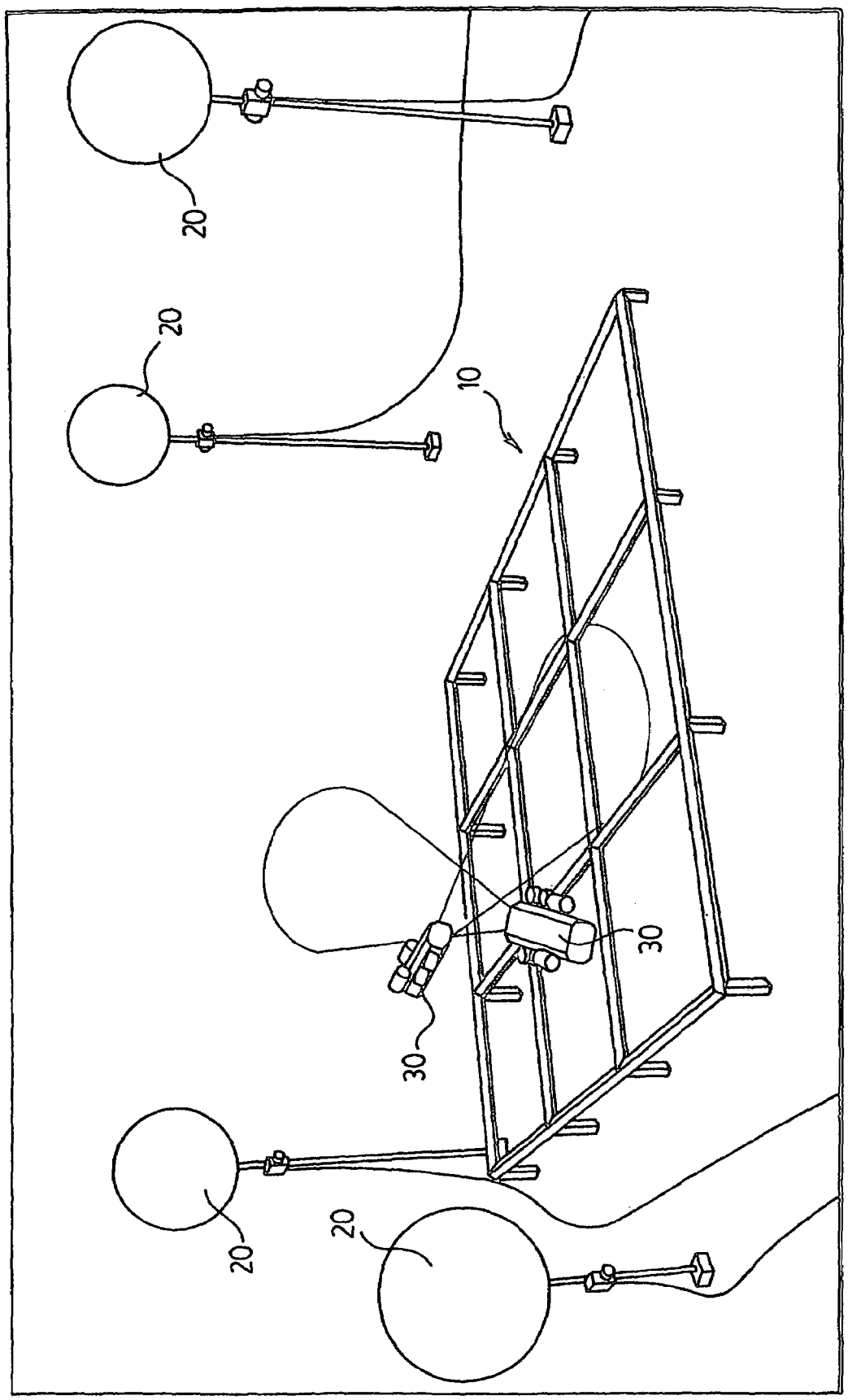
FIG. 1 is a perspective view of a communications zone according to the invention.
Figure 12:
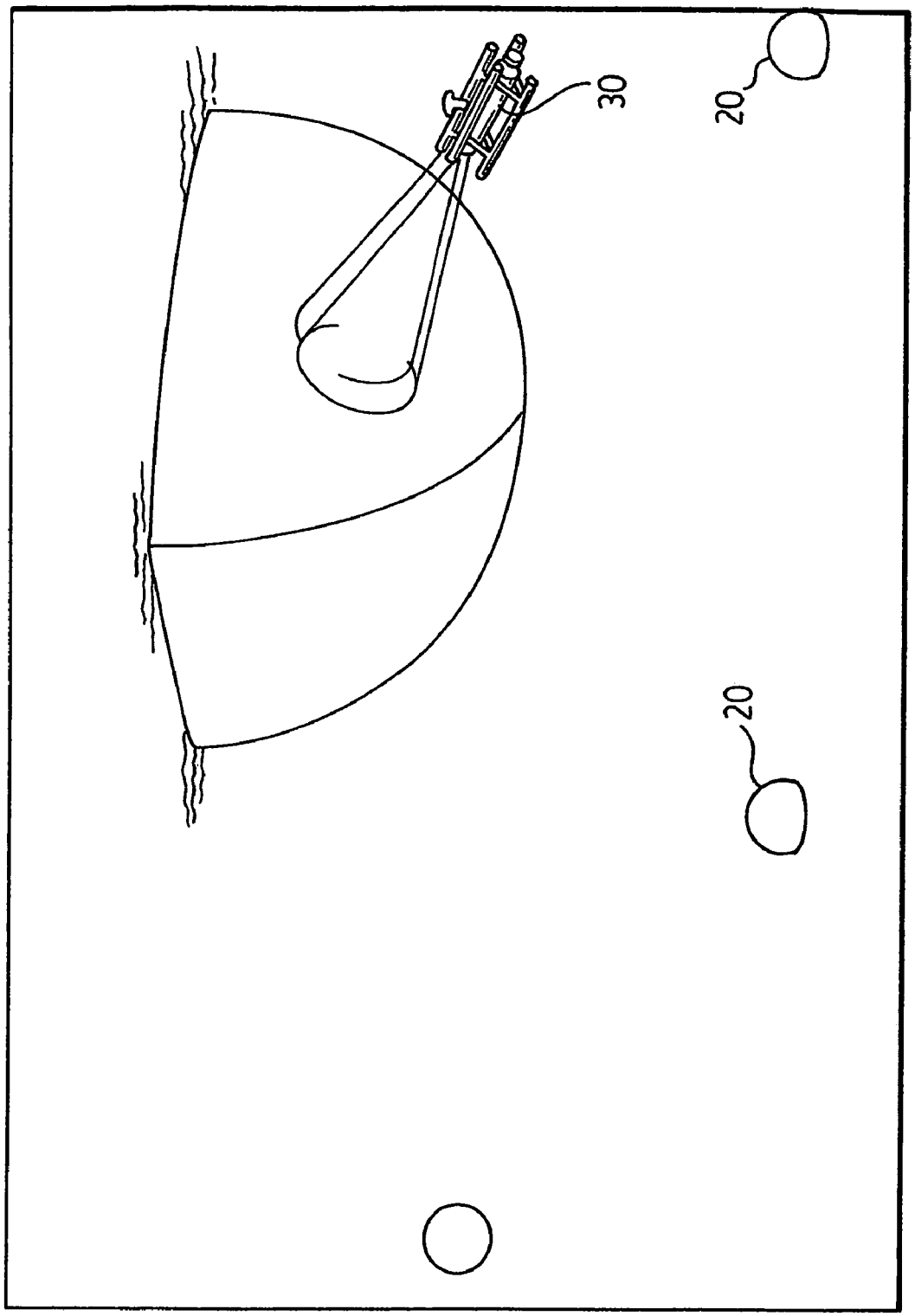
FIG. 12 is a schematic perspective view of a submersible craft using the communications system of the invention for inspecting a boat hull.
Figure 15:
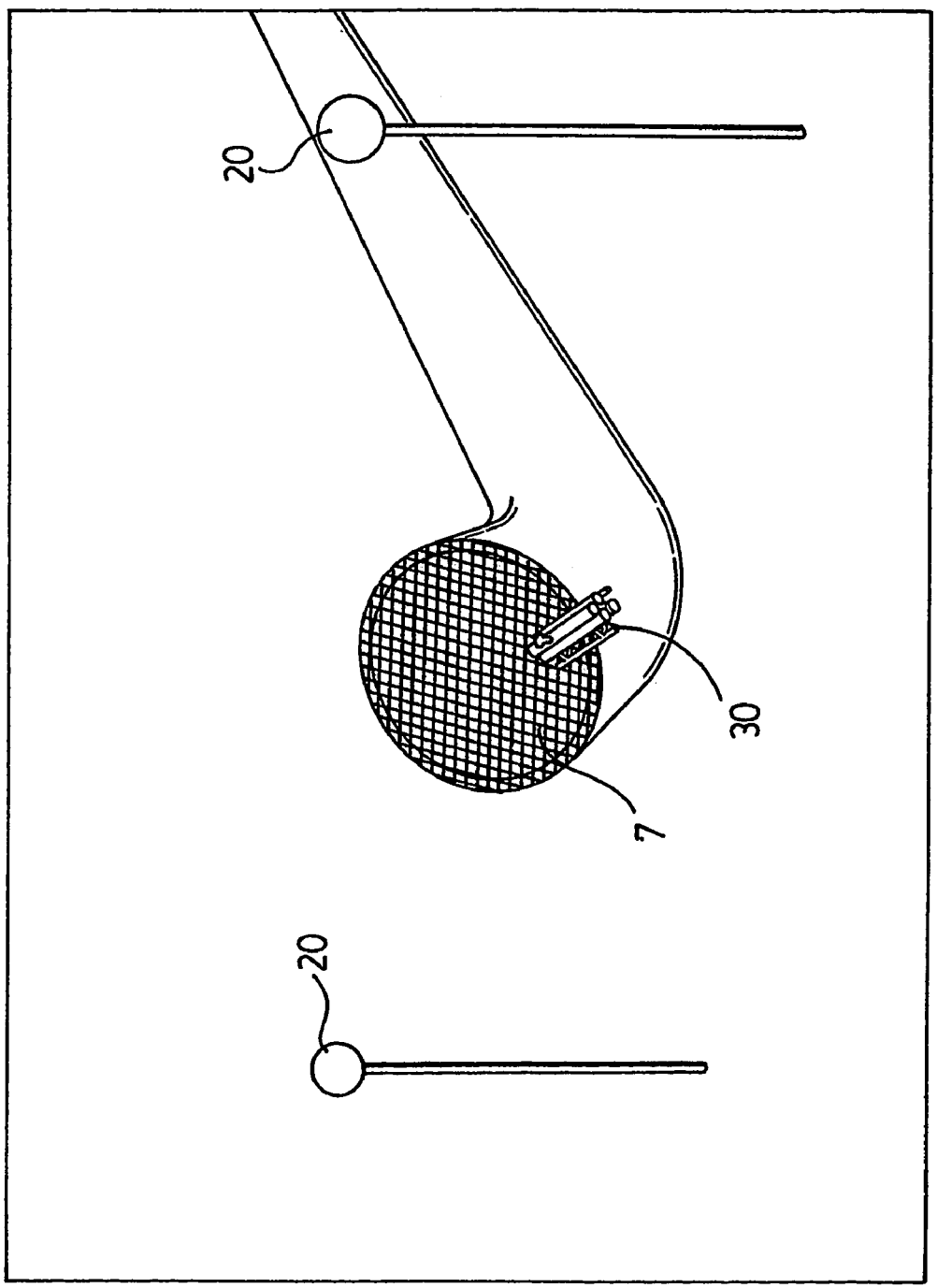
FIG. 15 is a schematic perspective view of a submersible craft using the communications system of the invention for inspecting a water intake pipe.

FIG. 1 illustrates a communications zone 10 in an underwater optical communications system and method according to the present invention. It will be appreciated that the principles of the invention can also be applied to surface-based and space-based communications systems. Further, although the communications system of the invention is advantageously used in underwater mining applications, it can also be used for such tasks as border security (marine patrol), underwater inspection of boat hulls as shown in FIG. 12, inspection of water intake pipes 7 as shown in FIG. 15, and many other applications.

Figure 6:
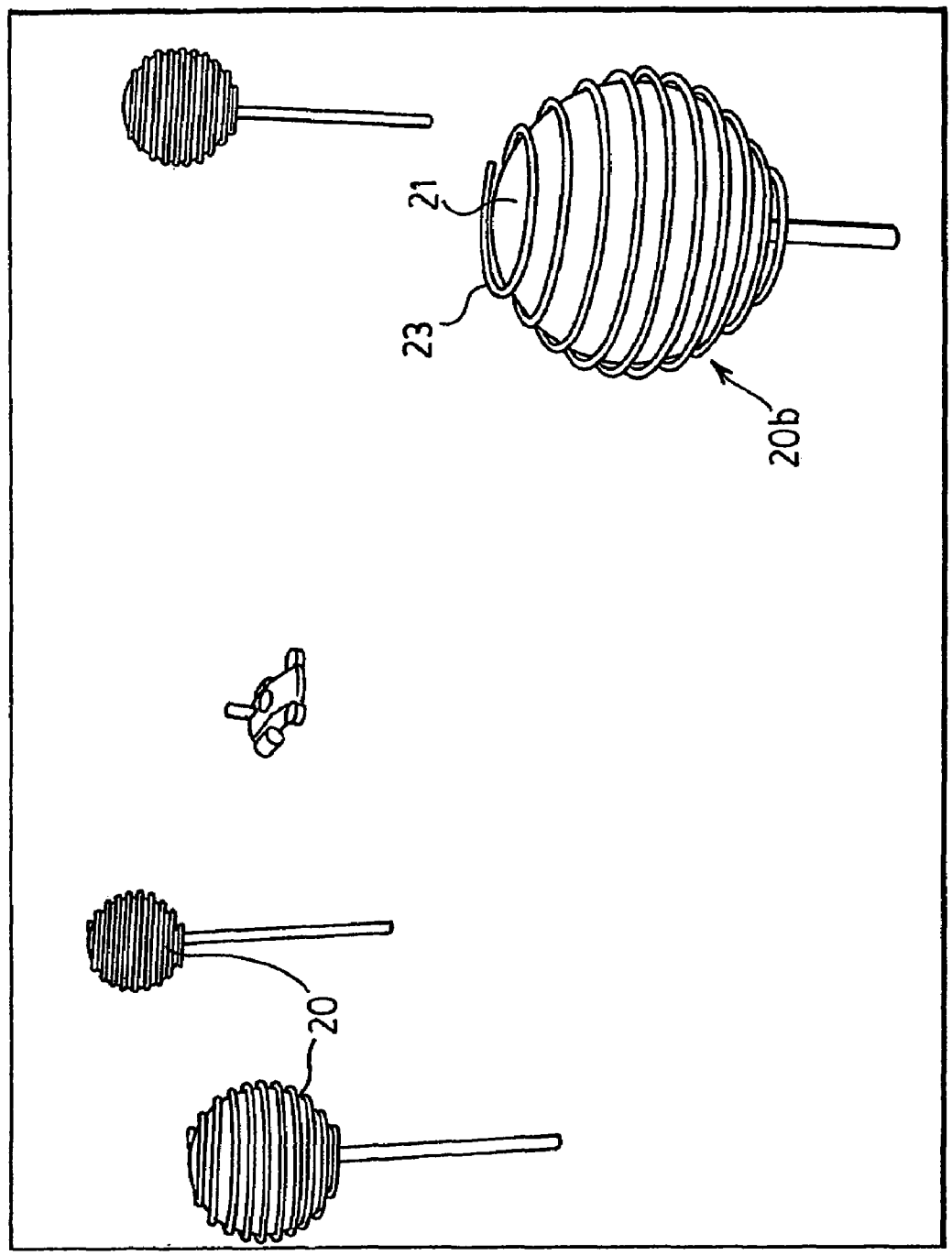
FIG. 6 is a schematic perspective view of a communications zone utilizing spherical beacons with linear light emitters.
Figure 7:
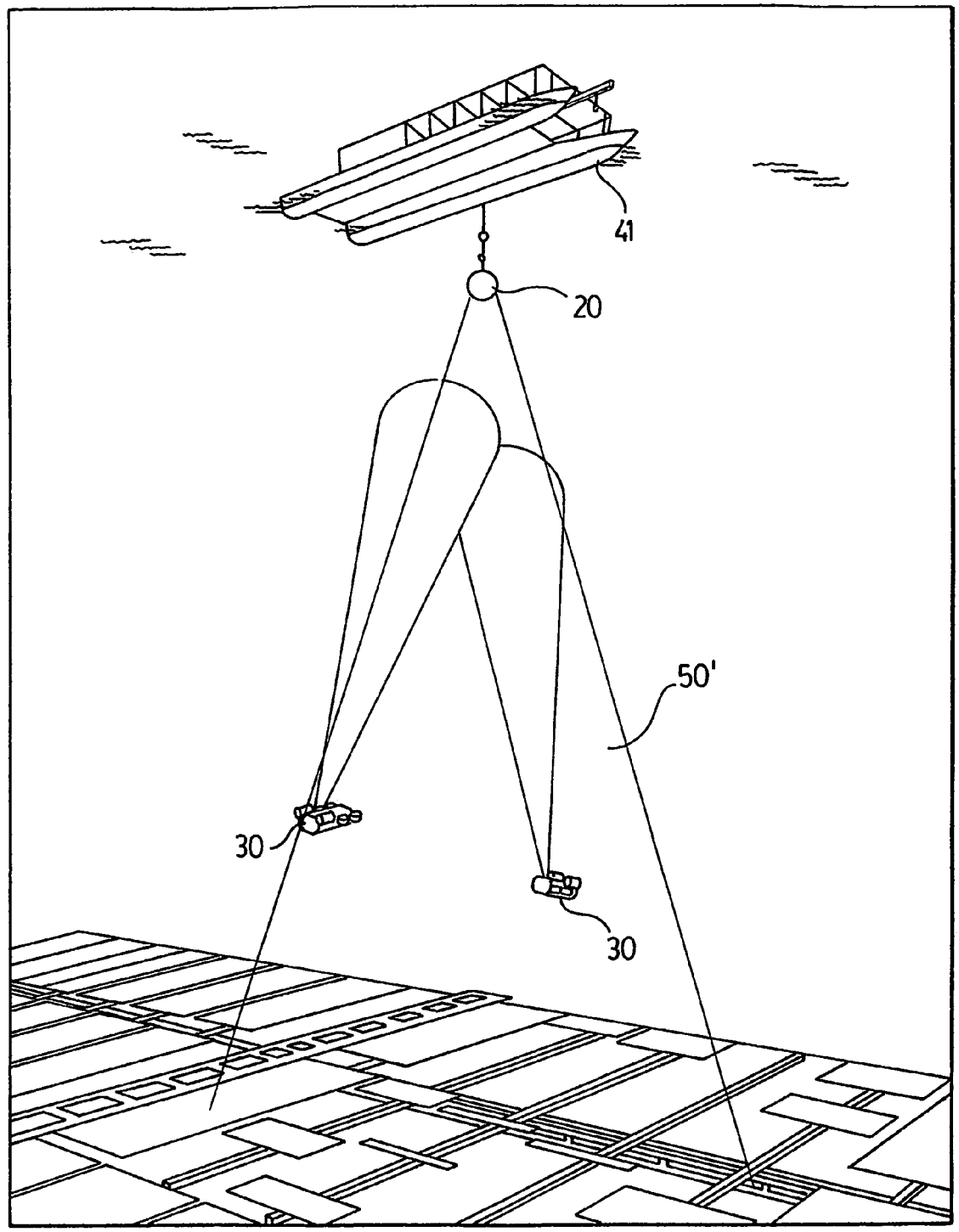
FIG. 7 is a schematic perspective view of a communications zone established adjacent to the water's surface using a beacon suspended from a floating craft.
Figure 10:
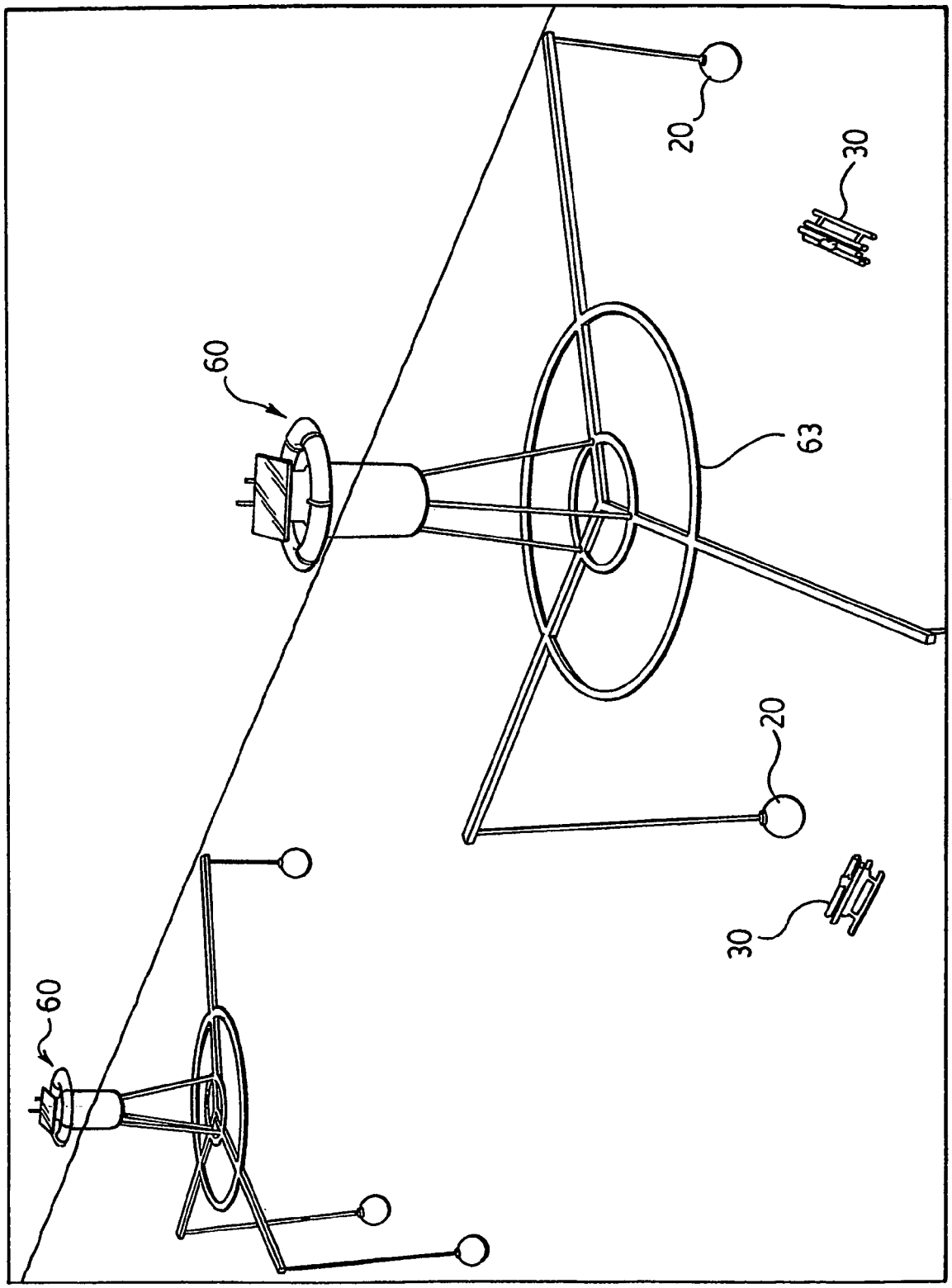
FIG. 10 is a schematic perspective view of a floating relay unit of FIG. 9 suspending a plurality of light beacons.
Figure 14A:
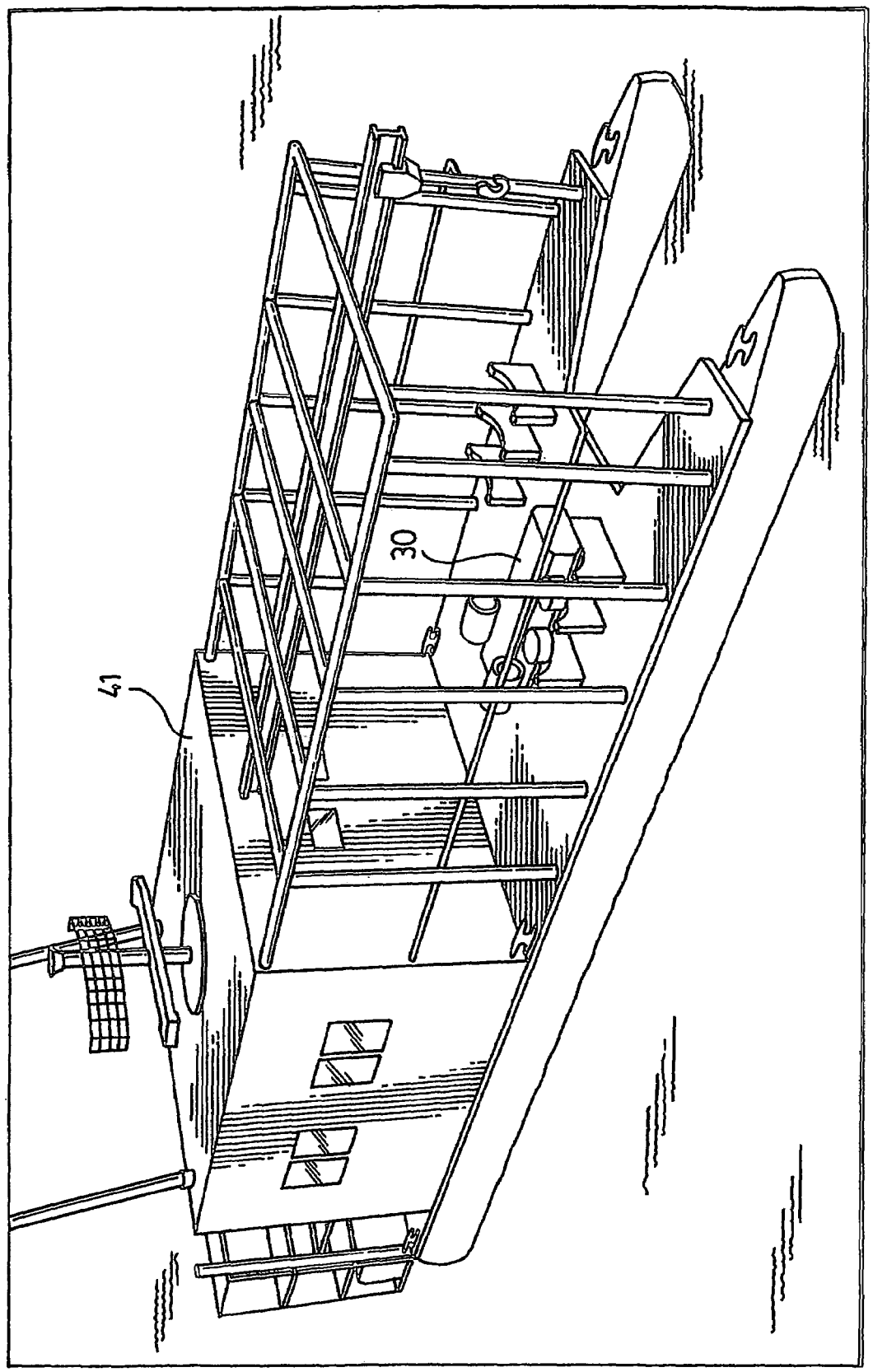
FIGS. 14A and 14B are schematic perspective views of a floating craft having an on-board control station.

The communications zone 10 is defined by light beacons 20b, shown in FIG. 6, which are preferably dispersed generally uniformly throughout the communications zone 10. The beacons 20 may be buoyant and affixed to anchors set on the floor of a body of water, or may hang from a boat or other buoyant object floating on the water's surface, as illustrated in FIGS. 7, 10 and 14A.

Figure 5:
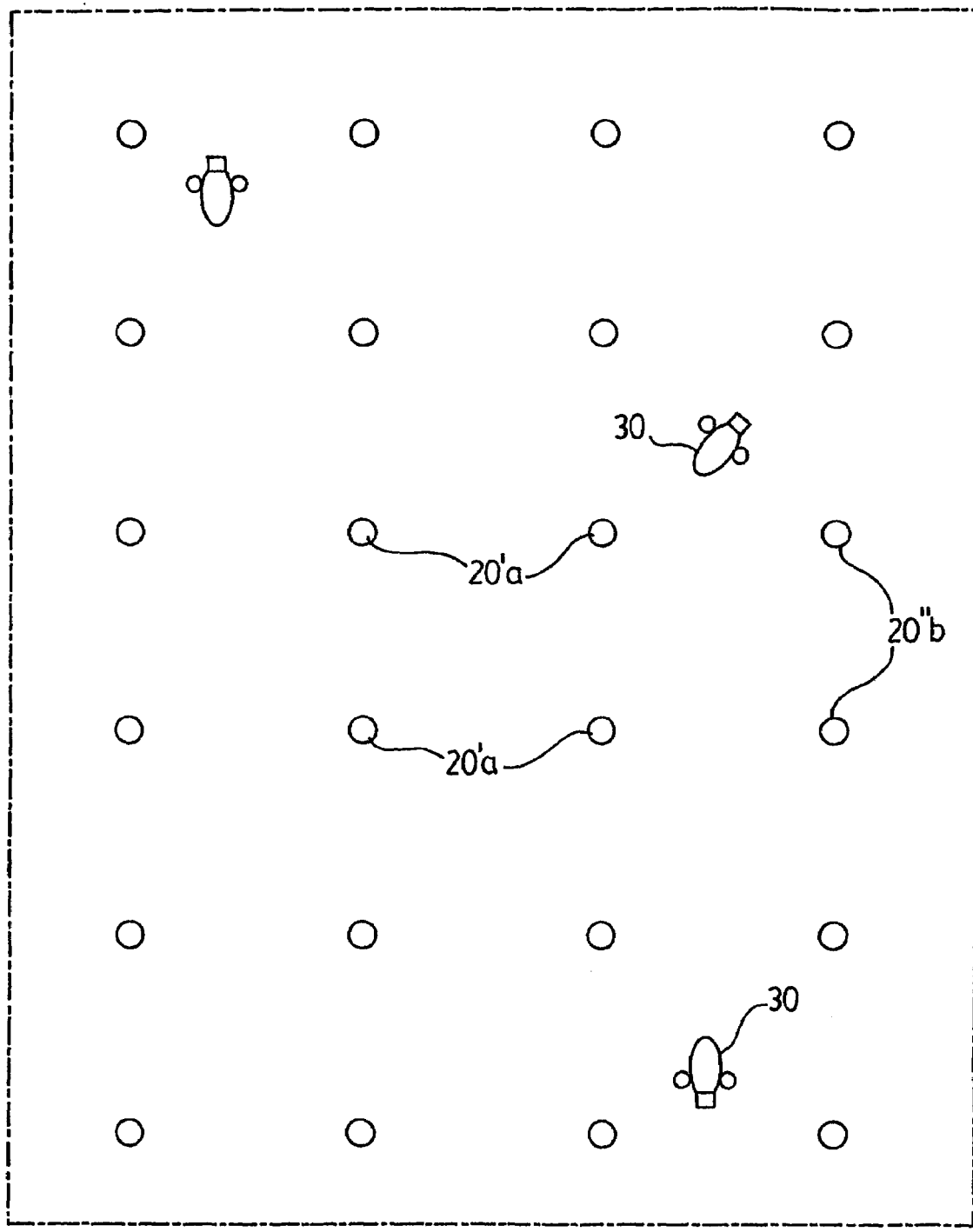
FIG. 5 is a schematic view of a communications zone having multiple beacon cells.
Figure 8:
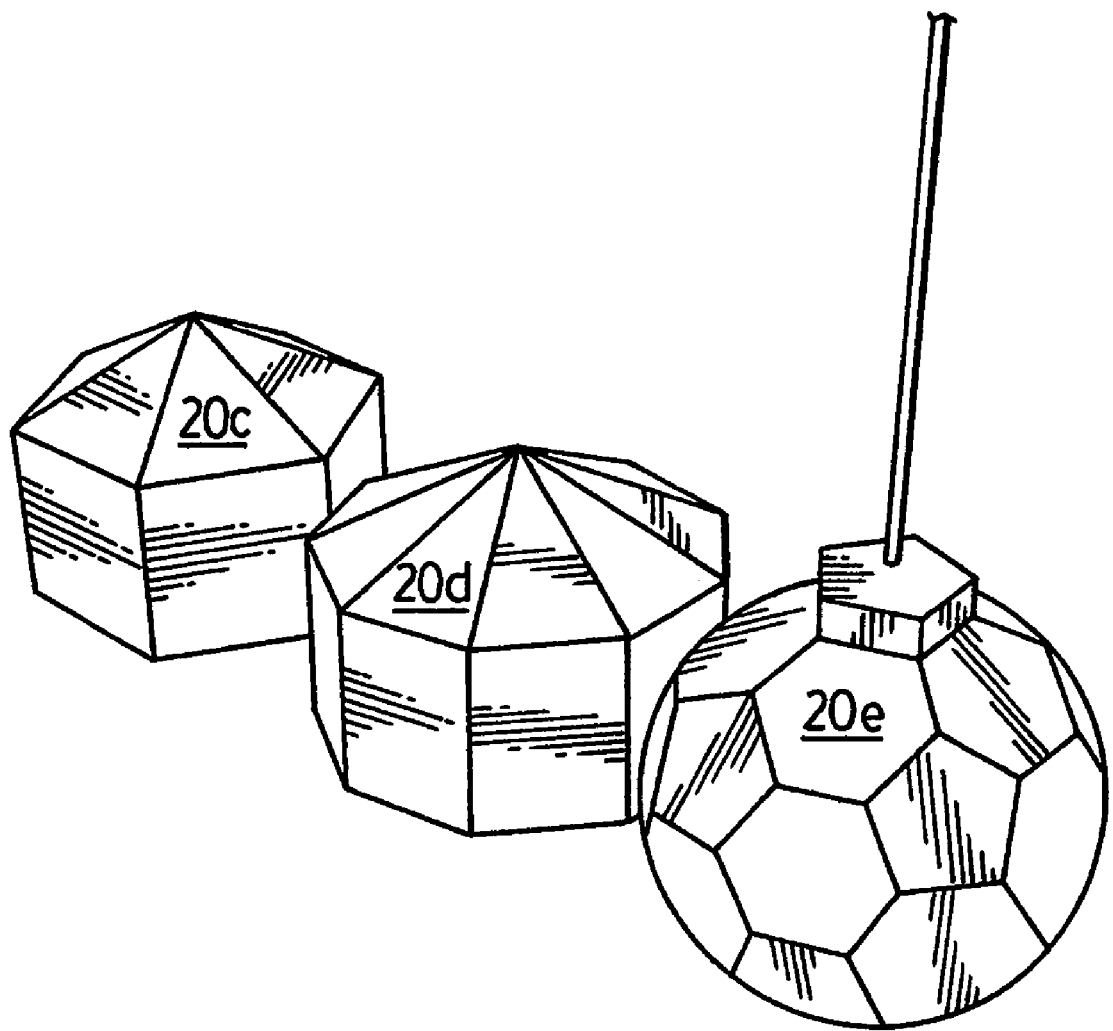
FIG. 8 is a schematic perspective view of different configurations of multi-faceted beacons.

In contrast to the 'single cell' communications zone 10 illustrated in FIG. 1, FIG. 5 illustrates a 'multiple-cell' embodiment of the invention in which the communications zone 50 comprises a matrix of interior light beacons 20' and peripheral light beacons 20". The light beacons 20' in the interior of the communications zone 10 are fully multi-directional, and may for example be spherical as illustrated in FIG. 6, or in other embodiments may be multifaceted such as the configurations 20c, 20d and 20e shown in FIG. 8 by way of example only. In the embodiment illustrated the light beacons 20" operating at the periphery of the communications zone 10 are also fully multi-directional, so that the communications zone 10 extends for a distance beyond the peripheral light beacons 20". It will be appreciated that it is possible to utilize peripheral light beacons 20" that are directional and emit light only toward the communications zone 10, for example the directional beacons 20a shown in FIG. 2, in which case the communications zone 10 will not extend substantially beyond the peripheral light beacons 20". The light beacons 20 may be interconnected through a network, or may all be connected directly to a control station 40.

Figure 2:
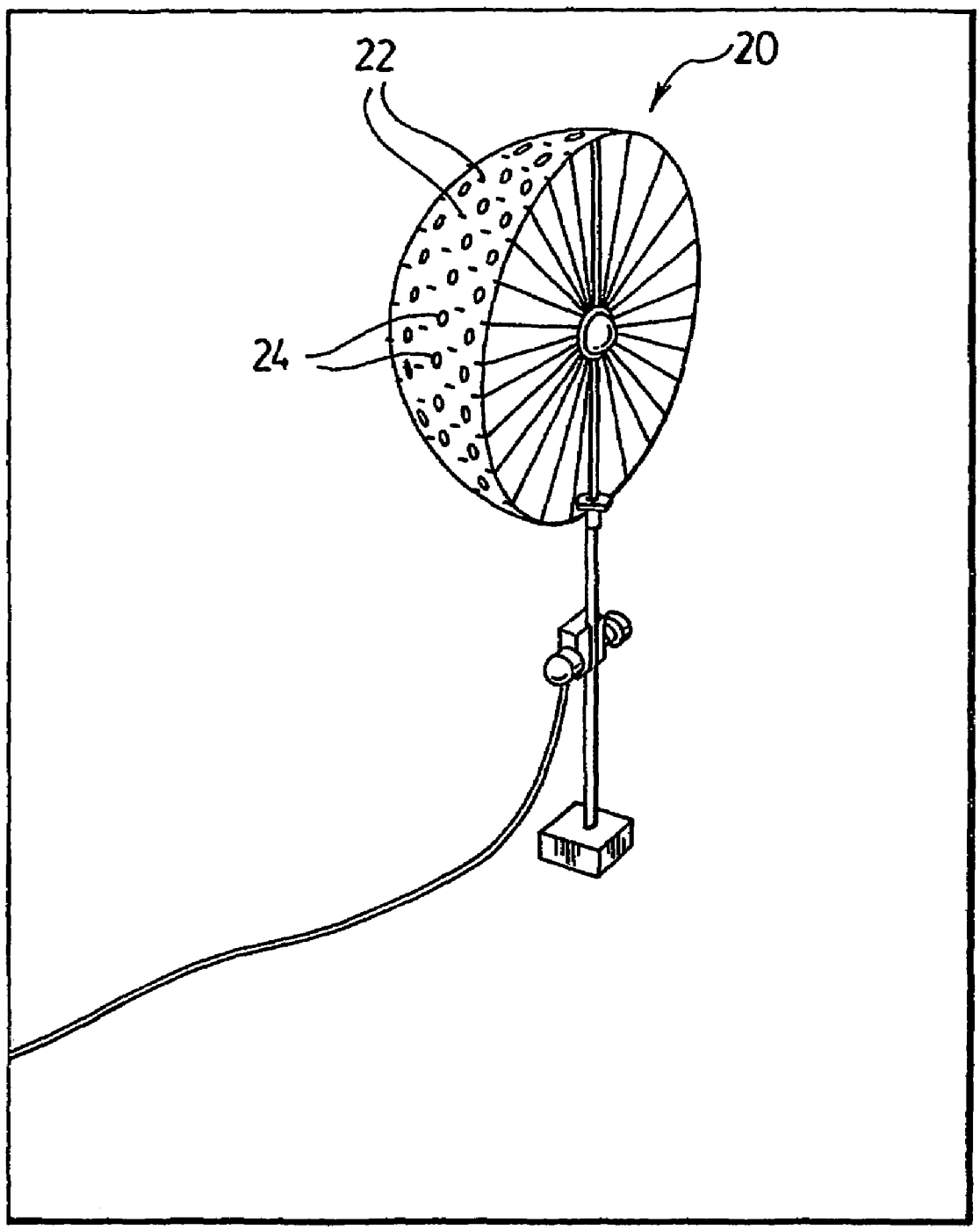
FIG. 2 is a perspective view of a typical light beacon in the communications zone.
Figure 17:
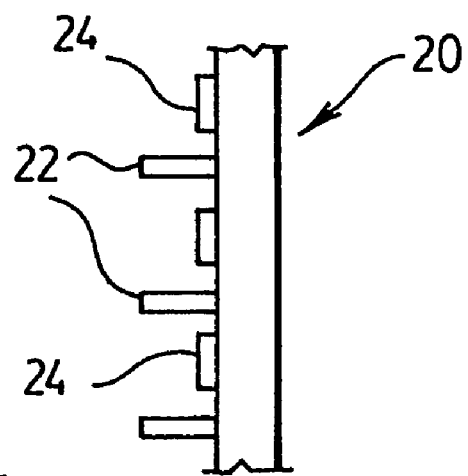
FIG. 17 is a partial side elevation of the light beacon of FIG. 2.

A preferred embodiment of the directional light beacons 20a is illustrated in FIG. 2. Each light beacon 20a is provided with a plurality of light-emitting elements 22 which are positioned so as to emit light relatively uniformly over the area of the body 21 of the beacon 20a. The light-emitting elements 22 preferably comprise short lengths of fibre optic cables mounted generally orthogonally to the body 21 and thus directed so as to transmit light in directionally, as shown in FIG. 17. In the embodiment shown the beacon 20a is slightly convex so that the light-emitting elements 22 emit light over an arc-shaped area of the communications zone 10. The directional light beacons 20a are most suitable for positioning as peripheral light beacons 20" about the periphery of the communications zone 10.

A preferred embodiment of the multi-directional light beacons 20b are the spherical embodiments illustrated in FIG. 6, which are most suitable for positioning as interior light beacons 20' about the interior of the communications zone 10 (but, as noted above, can also be utilized as peripheral light beacons 20" distributed about the periphery of the communications zone 10). In the preferred embodiment each light beacon 20b is provided with an elongated light-emitting element such as a light rope 23 which is mounted to the body 21 in a spiral or helical configuration, so that the light beacon 20b emits light substantially uniformly in substantially all directions. Further preferred embodiments are the multi-faceted light beacons 20c, 20d and 20e illustrated in FIG. 8, and particularly the "soccer ball" configuration at the right of the drawing, which are designed to utilize point light emitters 22 but emit light substantially uniformly in most directions.

The beacons 20 preferably emit light in the visible spectrum, via light emitting diodes (LED's) or any other suitable light emitting element. The precise wavelengths will be selected based on the attenuation characteristics of the environment, and can be achieved by selection of the light-emitting elements 22 or 23 and/or by optical filtering. By way of example only, certain wavelengths of green light in the range around 5,100 to 5,200 Angstroms have been found to travel well through seawater. The particular wavelength and intensity of light most suitable for the optical communications may depend upon the transmissivity of the water, the type of suspension (e.g. organic, sedimentary etc.) causing any cloudiness or murkiness, and the spectral characteristics of ambient light within the communications zone 10. However, the particular wavelengths (use of more than one wavelength of light can be advantageous, as described below) and intensity of the light-emitting elements 22 or 23, can be optimized through experimentation.

The submersible craft 30 and the control station 40 each comprise suitable electro-optical circuitry for converting optical signals received by the light beacons 20 from the submersible craft 30 to electrical signals, and for converting electrical control signals received from the control station 40 to optical signals sent by the light beacons 20 to the submersible craft 30. The light signals emitted by the light emitting elements 22 or 23 may be modulated in any suitable fashion. There are many devices and systems for converting electrical pulses to discrete optical pulses, and for converting optical pulses to discrete electrical pulses, in the analog and digital domains, which are well known to those skilled in the art. There are also optical communications systems described in the art, some of which are free space communications systems and some of which include multiplexing systems for achieving higher data rates, by way of non-limiting example only, the System and Method for Free Space Optical Communications Using Time Division Multiplexing of Digital Communication Signals described in U.S. Pat. No. 6,246,498 issued to Dishman et al. on Jun. 12, 2001; the Optical Space Communication Apparatus Sending Main Signals and an Auxiliary Signal for Controlling the Intensity at the Receiver described in U.S. Pat. No. 5,610,748 issued to Sakanaka et al. on Mar. 11, 1997; and the Optical Communications System described in U.S. Pat. No. 5,896,211 issued to Watanabe on Apr. 20, 1999; all of which are incorporated herein by reference. The invention is not intended to be limited to any particular opto-electric conversion methodology or communications system.

Figure 16:
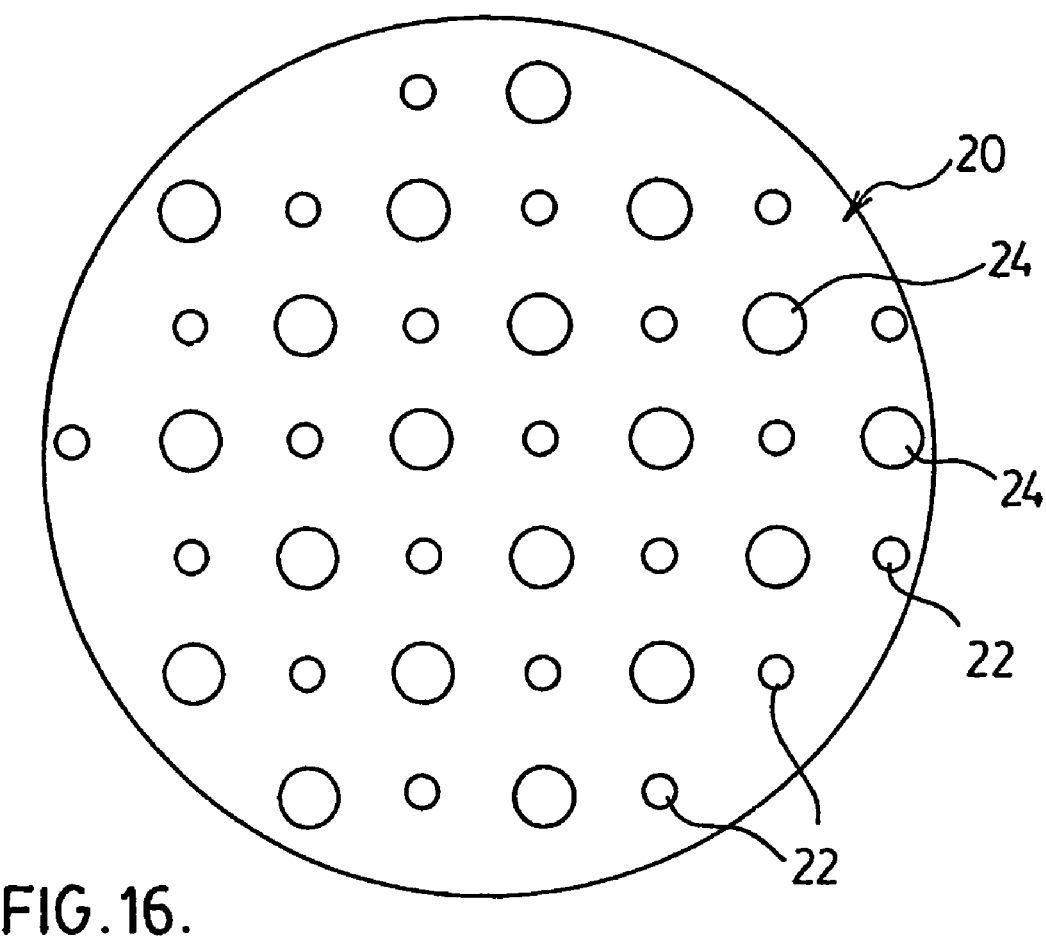
FIG. 16 is a partial front elevation of the light beacon of FIG. 2.

As shown in FIGS. 16 and 17, interspersed amongst the light emitting elements 22 or 23 are optical receiver elements 24, which may comprise spherical or wide-angle cameras, or any detector sensitive to the particular wavelength(s) of light selected for the light emitting elements 22 or 23. The optical receiving elements 24 are preferably set back or recessed into the interstitial spacing between the light emitting elements 22 or between turns of the light rope 23, or otherwise shielded so that light emitted by the beacon 20 does not add to the ambient light or optical 'noise' affecting the sensitivity of the optical receiving elements 24.

Figure 3:
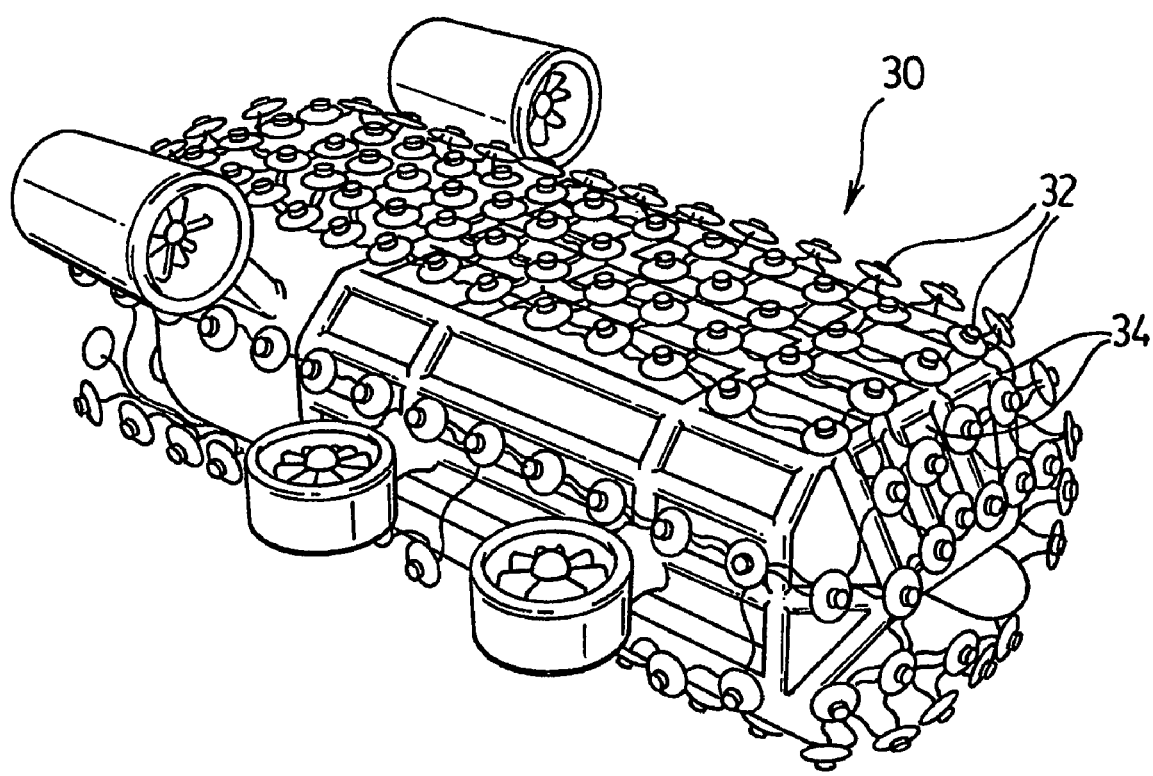
FIG. 3 is a perspective view of a watercraft according to the invention.

FIG. 3 illustrates a submersible craft 30 which, like the beacons 20, is provided with light emitting elements 32 and optical receiving elements 34 interspersed amongst the light emitting elements 32. The craft 30 illustrated has point light sources similar to the light emitting elements 22 in the beacon 20 of FIG. 2, however it may alternatively be provided with an elongated light source such as the light ropes 23 used in the beacons illustrated in FIG. 6. The beacons 20 are dispersed about the communications zone 10 such that the submersible craft 30 is able to receive optical signals from one or more beacons 20 at all times, and to send optical communications to one or more beacons 20 at all times, regardless of the orientation of the craft 30 and regardless of the position of the craft 30 within the communications zone 10. The light beacons 20 are spaced closely enough to ensure that, within the communications zone 10, the submersible craft 30 is always in optical communication with at least one beacon 20, and operate in a "hand-off" fashion similar to that used in cellular telephone systems, in which as the telephone transceiver moves from one cell to the next the cellular tower which the telephone transceiver is approaching establishes a communications link with the transceiver and the cellular tower from which the transceiver is receding cuts off its communications link.

At the same time, the light beacons 20 are preferably spaced far enough apart that they do not significantly interfere with the ability of the submersible craft 30 to manoeuvre through the communications zone 10. The ideal spacing may depend upon many factors, including the intensity of the light emitting elements 22 and 32, the sensitivity of the light receiving elements 24 and 34, the transmissivity of the water (including the particular cause of any cloudiness or murkiness), and ambient light levels within the communications zone 10.

It is also advantageous to space the beacons 20 so that the submersible craft 30 is always in optical communication with at least three beacons 20. This will allow for positioning/locating the submersible craft 30 by triangulation.

The beacons 20 may also be located at varying elevations, to support triangulation for positioning/locating the submersible craft 30 vertically. For example, FIG. 7 illustrates a communications zone 50' defined by a single light beacon 20 suspended from a floating craft 41. The light beacon 20, which is powered by a generator or battery on board the craft 41, is a directional light beacon 20a and thus creates a cone-shaped communications zone 50' that widens as the depth increases. Further examples are illustrated in FIG. 10, in which a floating communications relay 60 (described below) suspends a frame 63 which in turn suspends a plurality of light beacons 20e, creating a wider communications zone 50' with a periphery that increases as the depth increases; and in FIG. 11, in which the communications zone is defined by a plurality of light beacons 20e suspended at different depths by semi-buoyant members 65. In each case the light beacons 20 are spaced closely enough to ensure that, within the communications zone 50', the submersible craft 30 is always in optical communication with at least one beacon 20.

Using for example wavelength division multiplexing (WDM), data rates of 10 Mb/s or even higher can be achieved by present techniques for a single wavelength of light. In the preferred embodiment, one of the beacons 20 and the submersible craft 30 transmits at a first wavelength, for example in the green portion of the visible light spectrum, and receives at a second wavelength, for example in the blue portion of the visible light spectrum; while the other of the beacons 20 and the submersible craft 30 transmits and receives at the second and first wavelengths, respectively. By using two frequencies of light in this fashion, as long as the band separation is sufficient bidirectional communications can occur simultaneously without interference, thus enhancing the communications speed. Moreover, as the frequency increases, both the data rate and the directional sensitivity of the optical receivers 24, 34 increases.

Figure 4:
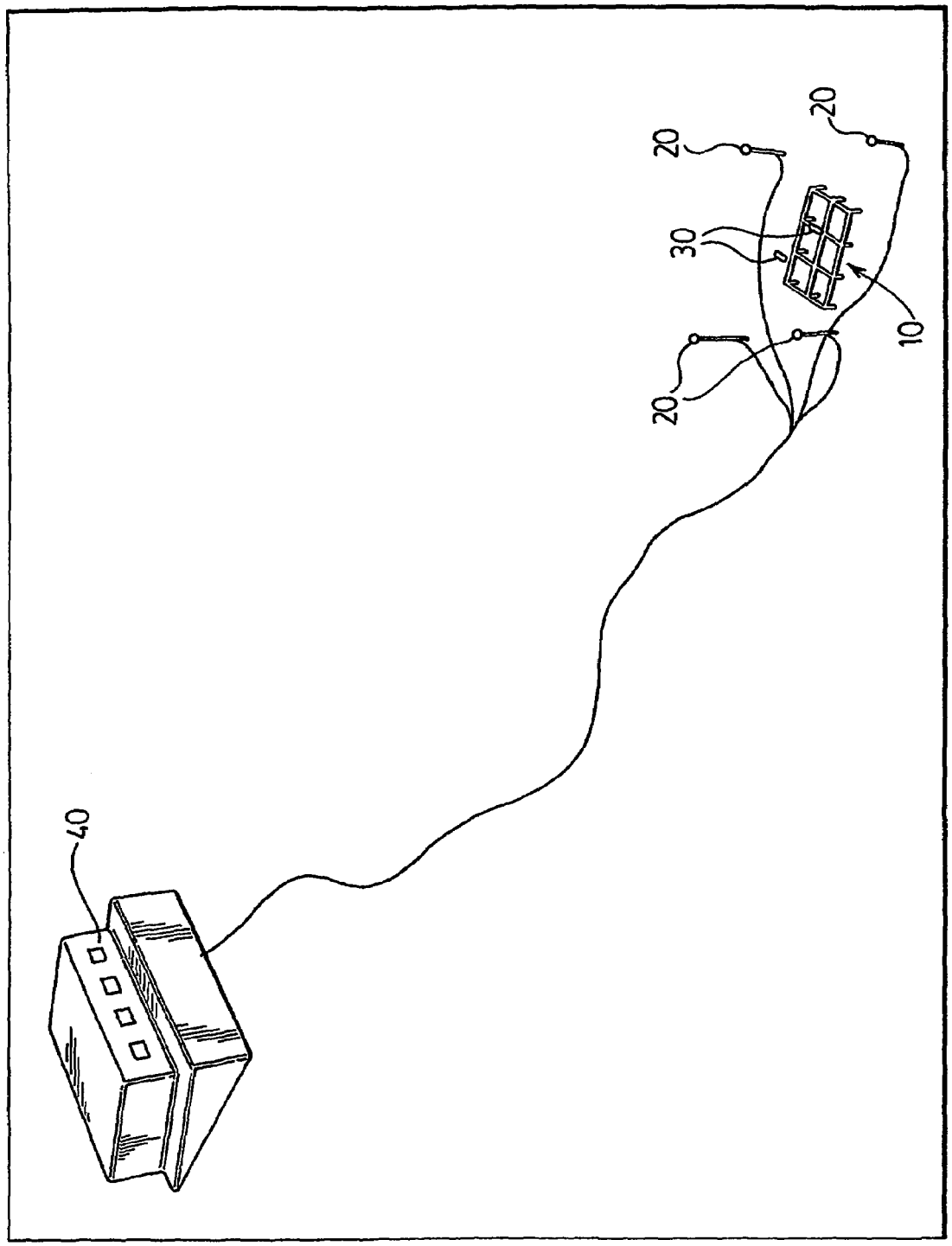
FIG. 4 is a schematic perspective view of the communications zone of FIG. 1 showing the remote control centre.

The light beacons 20 may powered by an electrical generator contained in a land-based control centre 40, shown in FIG. 4, or a or surface-based control centre such as a floating watercraft 41 (shown in FIG. 14) or communications relay buoy 60 (shown in FIGS. 9 to 11), and connected to the beacons 20 by optical fibres or electrical cables (not shown). The submersible craft 30 may be powered by any conventional means. The control centre 40 or 41 and the submersible craft 30 would in the preferred embodiment each comprise computers, an optical switching system, and an on-board Transmit/Receive link, each of which may be of conventional design which is well known to those skilled in the art, but by way of example only such a system is described in U.S. Pat. No. 4,905,309 issued Feb. 27, 1990 to Maisonneuve et al., which is incorporated herein by reference.

The communications methodology may comprise any conventional optical communications system, but preferably utilizes a packet-based system utilizing optical pulses to transmit the data packets. The preferred embodiment of the invention operates under a token passing system, in which each token is managed by a header and footer. Data, preferably including video from on-board cameras located about the submersible craft 30, is transmitted optically to the light beacons 20. Data and video information are displayed at the control station 40 for monitoring each submersible craft 30, and the return data stream controls the submersible craft 30, steering it to a new position or orientation and/or initiating a task.

Figure 11:
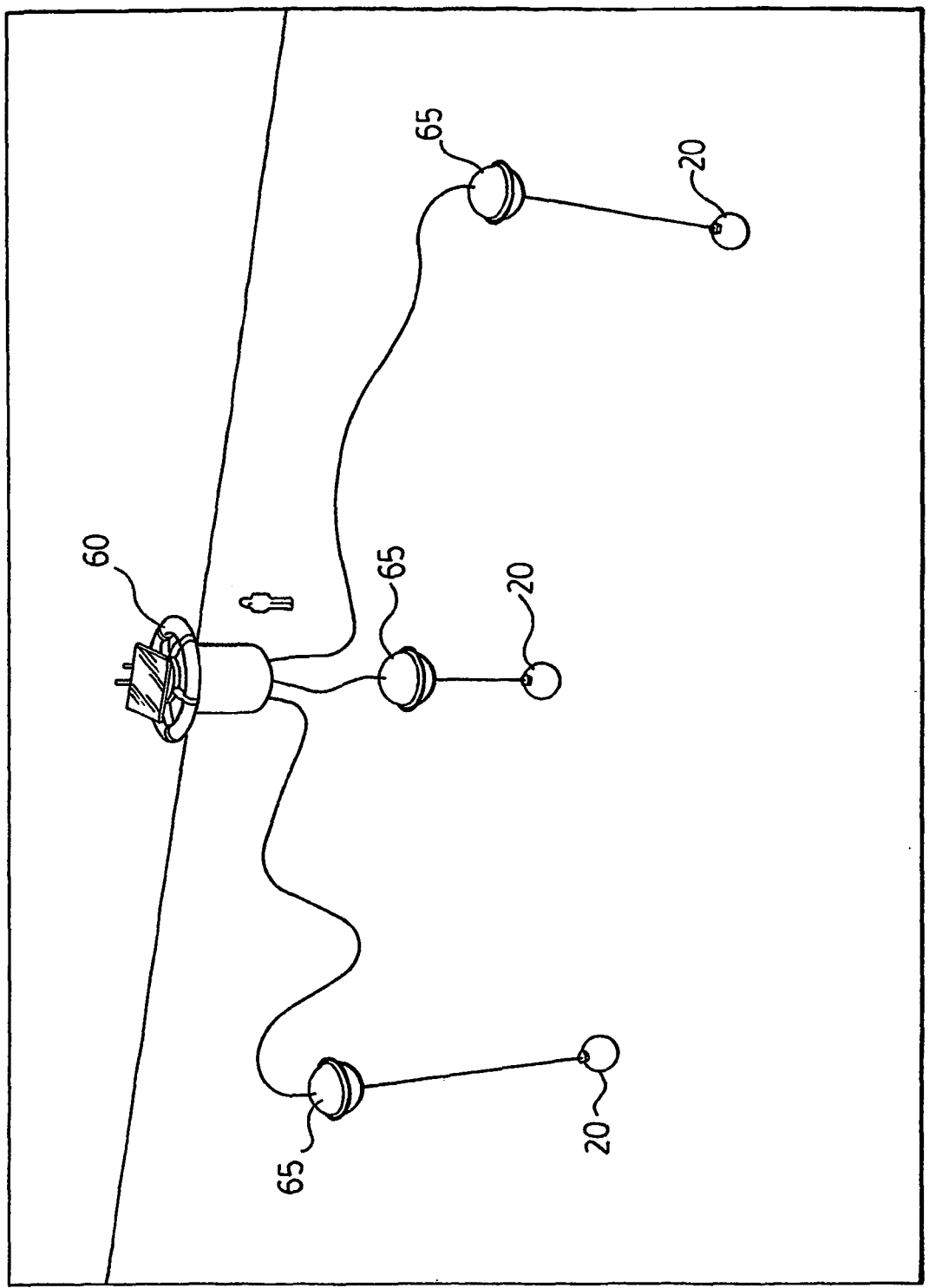
FIG. 11 is a schematic perspective view of a floating relay unit of FIG. 9 suspending a plurality of light beacons at different depths.
Figure 13:
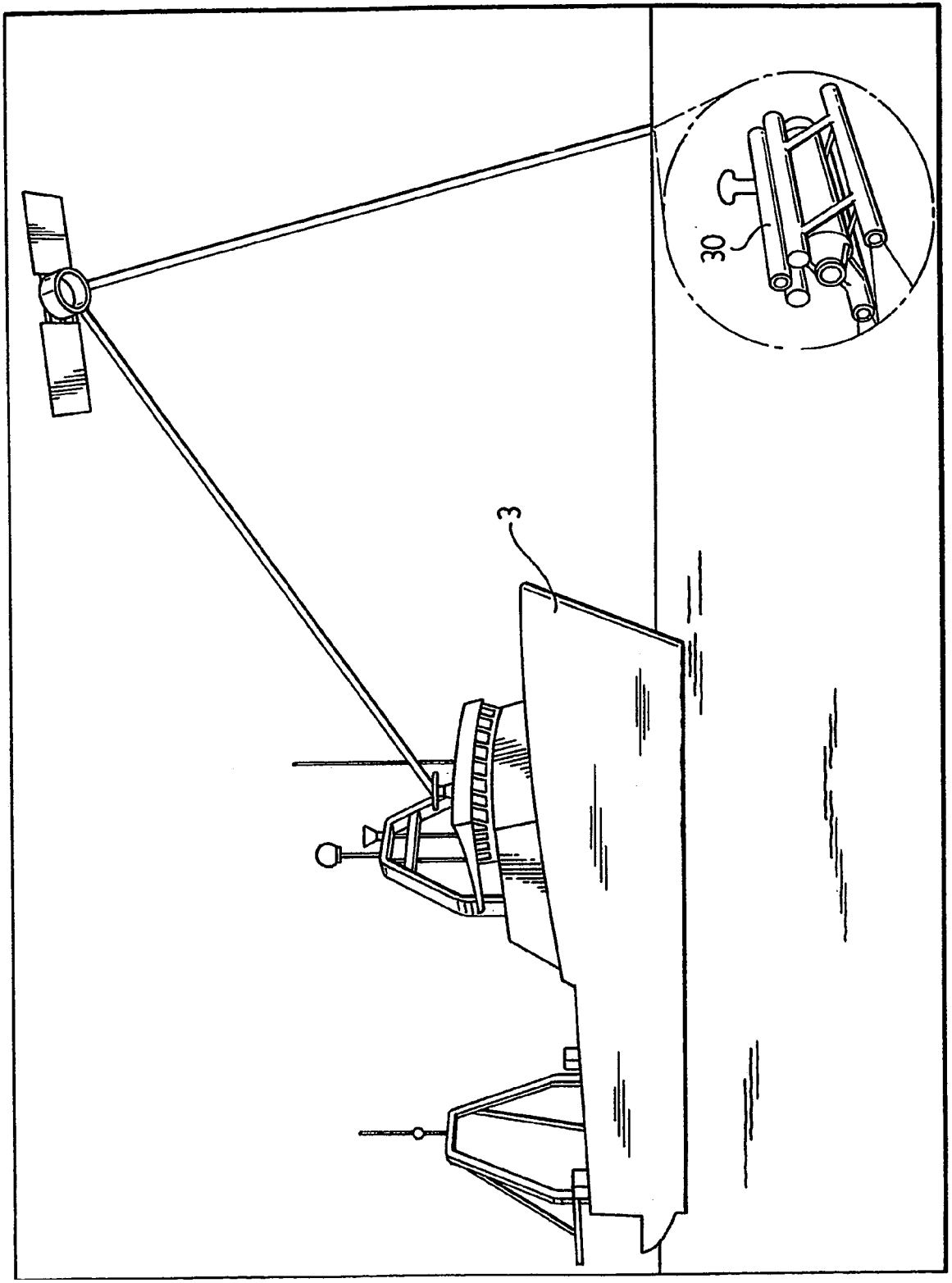
FIG. 13 is a schematic perspective view of a floating craft communicating with a submersible craft using the communications system of the invention.
Figure 14B:
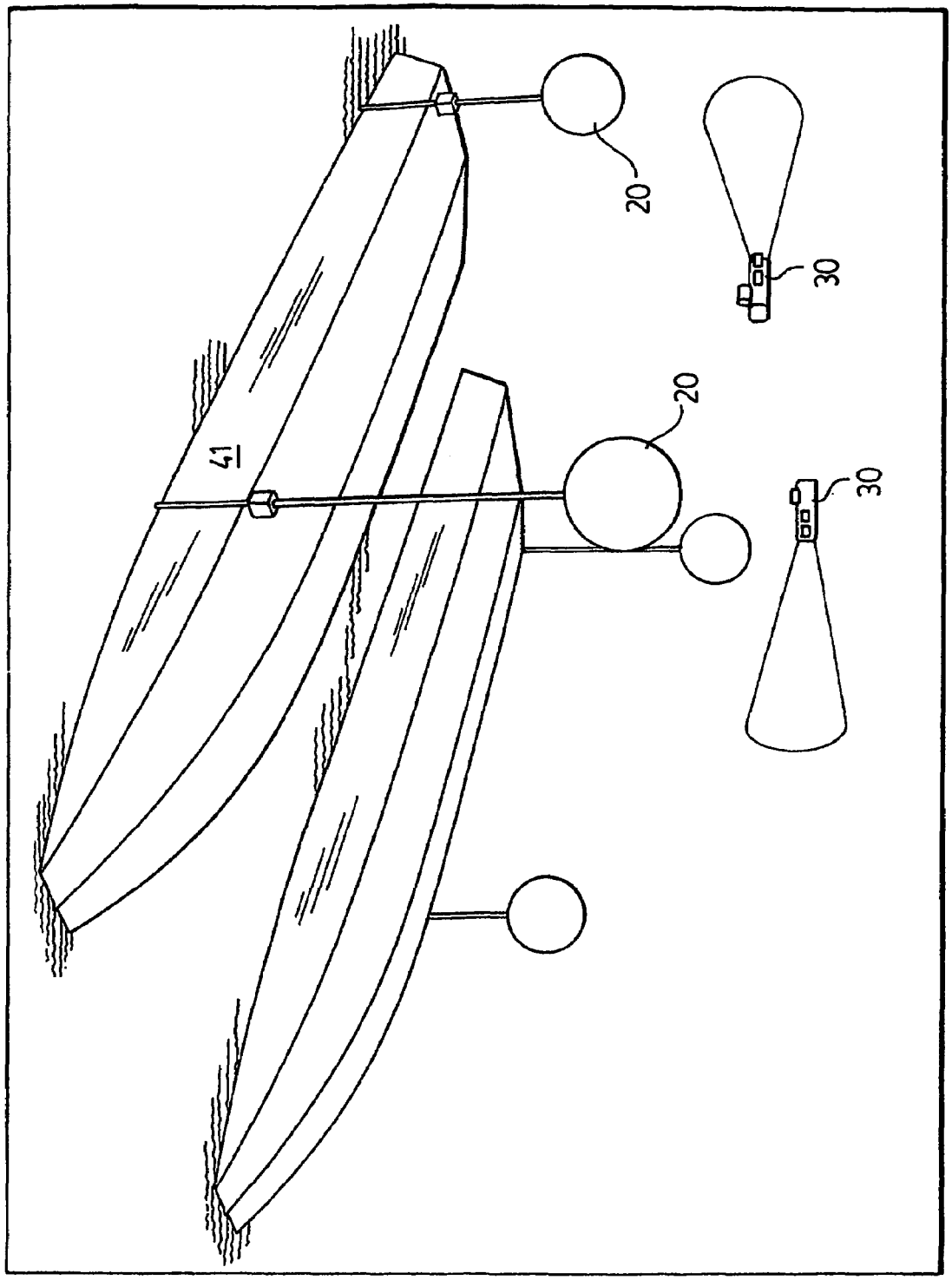

FIG. 9 illustrates a floating communications relay 60 for the invention, which can be used to suspend one or more light beacons 20, as illustrated in FIGS. 10 and 11. In the preferred embodiment the communications relay 60 comprises a protective collision ring 62 mounted to a water-tight, mounted to a buoyant casing 64 that also supports a Global Positioning System (GPS) antenna 69 and circuitry for precise positioning information and triangulation of the positions of the submersible craft 30, and optionally a solar cell for primary or auxiliary power and battery recharging. The casing 64 contains a power supply for powering suspended light beacons 20; the electro-optical circuitry for converting optical signals to electrical control signals and vice versa for communications between the light beacons 20 and the submersible crafts 30; and control circuitry for operating a radio frequency (RF) transceiver coupled between the electro-optical circuitry and a satellite antenna 68, for receiving control signals from and transmitting signals to a remote control station 40 (such as a ship having a control station 40 as shown in FIG. 14) and thus allowing the submersible crafts 30 to be controlled from a considerable distance away from the communications zone 10, 50 or 50', as shown in FIG. 13.

Preferably the light receiving elements 24 and 34 are coupled to light sensing circuitry having a sensitivity threshold, for example using a Schmidt trigger or comparator to establish a base light level below which the light receiving elements 24 and 34 do not register a light pulse, which can be set according to the average and/or peak ambient light levels within the communications zone. This maximizes reliability of the communications system, ensuring that the light receiving elements 24 and 34 are not saturated by ambient light so that all beacon- or submersible craft-emitted light pulses will be processed as communications signals.

It will be appreciated that the communications system and method of the invention can be used solely to control the submersible craft 30 within the communications zone 10, 50 or 50', in which case the craft 30 does not need to be equipped with light emitting elements 32 and the beacons 20 do not need to be equipped with light receiving elements 24. However, in the preferred embodiment the system and method of the invention also provides for communications from the craft 30 to the beacons 20, for example video transmissions, radar and/or sonar telemetry transmissions and the like, in which case both the beacons 20 and the craft 30 will be equipped with light emitting elements 22 or 23 and 32 and light receiving elements 24 and 34, respectively.

The control station 40 may comprise a conventional display for displaying a signal sent by cameras on-board the submersible craft 30, and any suitable control interface, for example a computer, allowing the operator to control the submersible craft 30 and its equipment through command signals transmitted to the light beacons 20, and thus to the submersible craft 30. Where multiple submersible crafts 30 are used, each submersible craft has a unique address and the packets in the digital data signals comprise the address of the particular submersible craft 30 for which the command is intended, for example in the packet header, so that only the intended submersible craft 30 reacts to the command. Similarly, data signals transmitted by each submersible craft 30 comprise the address of the particular submersible craft 30 transmitting the data, so that the control centre 40 recognizes the source of the transmission.

In the preferred embodiment the invention incorporates bit error rate testing and other techniques to ensure the integrity of the optical communications. However, in the preferred embodiment the submersible craft 30 is designed to automatically stop and sink to the bottom in the event of a communications interruption, to reduce the likelihood of the loss of a craft 30.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A communications system comprising a control station for transmitting control data to a plurality of light beacons, comprising the plurality of beacons dispersed about a communications zone, at least some of the beacons comprising one or a plurality of light-emitting elements positioned so that each beacon emits light in a plurality of directions, and at least one submersible craft comprising a plurality of light receiving elements positioned so that the craft receives light from a plurality of directions, whereby when the submersible craft is in the communications zone the submersible craft is in optical communication with at least one beacon for receiving control data from the at least one beacon via light signals emitted by the at least one beacon.

2. The communications system of claim 1, wherein at least some of the light beacons comprise light receiving elements positioned so that each beacon receives light from a plurality of directions and the at least one submersible craft comprises one or a plurality of light-emitting elements positioned so that the craft emits light in a plurality of directions, whereby when the submersible craft is in the communications zone the submersible craft is in optical communication with at least one beacon for sending data to the at least one beacon for transmission to the control station.

3. The communications system of claim 2, wherein the light beacons comprise substantially spherical light beacons.

4. The communications system of claim 3, wherein the one or a plurality of light elements comprises an elongated light element extending around a body of the light beacon.

5. The communications system of claim 3, comprising a plurality of submersible crafts and wherein each submersible craft transmits a data signal comprises a unique address.

6. The communications system of claim 2, wherein the light emitting elements comprise point light sources distributed about a body of the light beacon.

7. The communications system of claim 6, wherein the light emitting elements comprise optical fibres mounted to the body.

8. The communications system of claim 7, wherein at least some of the light beacons comprise multi-faceted bodies.

9. The communications system of claim 2, wherein at least some of the light beacons are anchored to a floor or bed of a body of water.

10. The communications system of claim 2, wherein at least some of the light beacons are suspended in a body of water by a floating object comprising a power source for energizing the light beacons.

11. The communications system of claim 10, wherein the floating object comprises a communications relay for relaying communications signals from the submersible craft to the light beacon to a radio frequency antenna or satellite, and for relaying communications signals from a remote control station to the light beacon via an radio frequency antenna or satellite for controlling the submersible craft.

12. The communications system of claim 10, wherein the light bacons are suspended at different depths.

13. The communications system of claim 2, wherein light signals are emitted by the light beacons at a first frequency and light signals are emitted by the at least one submersible craft at a second frequency that does not interfere with communications at the first frequency.

14. The communications system of claim 2, comprising a plurality of submersible crafts and wherein each submersible comprises a unique address for receiving data from the control station.

15. A communications method, comprising a. converting an electrical data signal into a light signal, b. transmitting the light signal in a plurality of directions from a plurality of beacons dispersed about a communications zone to at least one submersible craft comprising a plurality of light receiving elements positioned so that the craft can receive the light signal from a plurality of directions, and c. converting the light signal back to an electrical data signal for controlling the at least one submersible craft.

16. The method of claim 15 wherein the beacons comprising light receiving elements positioned so that each beacon can receive light from a plurality of directions, including the steps of:
 a. converting an electrical data signal into a light signal,
 b. transmitting the light signal in a plurality of directions from the at least one submersible craft to at least one of the beacons, and
 c. converting the light signal back to an electrical data signal.

17. The method of claim 16 comprising, before step a., the steps of converting the electrical data signal to a radio frequency signal and transmitting the radio frequency signal to a control station.

18. The method of claim 16, wherein light signals are emitted by the light beacons at a first frequency and light signals are emitted by the at least one submersible craft at a second frequency that does not interfere with communications at the first frequency.

19. The method of claim 15 comprising, before step a., the steps of receiving a radio frequency signal from a control station and converting the radio frequency signal to an electrical data signal.

20. The method of claim 15, wherein a plurality of submersible crafts each comprises a unique address for receiving data.

* * * * *